(12) United States Patent
Huillet et al.

(10) Patent No.: US 9,795,247 B2
(45) Date of Patent: Oct. 24, 2017

(54) BEVERAGE MACHINE WITH A HANDY OUTLET

(75) Inventors: Frederique Huillet, Chexbres (CH); Fabien Ludovic Agon, Blonay (CH)

(73) Assignee: Nestec S.A., Vevey (CH)

( * ) Notice: Subject to any disclaimer, the term of this patent is extended or adjusted under 35 U.S.C. 154(b) by 624 days.

(21) Appl. No.: 13/882,072

(22) PCT Filed: Oct. 20, 2011

(86) PCT No.: PCT/EP2011/068363
§ 371 (c)(1),
(2), (4) Date: Apr. 26, 2013

(87) PCT Pub. No.: WO2012/055765
PCT Pub. Date: May 3, 2012

(65) Prior Publication Data
US 2013/0220140 A1    Aug. 29, 2013

(30) Foreign Application Priority Data

Oct. 27, 2010    (EP) .................................... 10189061

(51) Int. Cl.
*A47J 31/44*    (2006.01)
*A47J 31/40*    (2006.01)
*A47J 31/36*    (2006.01)

(52) U.S. Cl.
CPC ....... *A47J 31/4403* (2013.01); *A47J 31/3623* (2013.01); *A47J 31/407* (2013.01)

(58) Field of Classification Search
CPC ... A47J 31/3623; A47J 31/4403; A47J 31/407

(Continued)

(56) References Cited

U.S. PATENT DOCUMENTS

| 7,707,927 B2 | 5/2010 | Boussemart et al. |
| 2008/0160153 A1* | 7/2008 | Hestekin ................. A23L 1/296 |
| | | 426/590 |

(Continued)

FOREIGN PATENT DOCUMENTS

| CO | WO 0228763 A1 * | 4/2002 | ............... B67D 1/04 |
| WO | 2009074553 | 6/2009 | |
| WO | WO2010025427 | 2/2010 | |

*Primary Examiner* — Dana Ross
*Assistant Examiner* — Kuangyue Chen
(74) *Attorney, Agent, or Firm* — K&L Gates LLP

(57) ABSTRACT

A machine (1) for preparing a beverage comprises: a mixing unit (10) for receiving a capsule (5) containing a pre-portioned flavoring ingredient; a liquid circuit (20) for circulating a liquid from a liquid reservoir (25) into the mixing unit for mixing said flavoring ingredient and said liquid to form the beverage (6); a beverage outlet (30) for dispensing such beverage upon formation to a beverage dispensing area (35) for supporting a user-cup or a user-mug (100); and a carrying handle (50) for seizing and carrying such machine single-handed. The carrying handle (50), in particular when seized single-handed during such carrying: extends over and above said beverage dispensing area (35); and/or has a seizure surface (51) forming a loop (52) in cross-section around the mixing unit (10) and/or the beverage outlet (30), the seizure surface being seizable by a single human hand (2) over a predominant part of the cross-sectional loop (52).

18 Claims, 2 Drawing Sheets

(58) Field of Classification Search
USPC .............................................. 99/295, 289 R
See application file for complete search history.

(56) References Cited

U.S. PATENT DOCUMENTS

2008/0282896 A1* 11/2008 Andrew .............. A47J 31/0573
99/280
2011/0126717 A1* 6/2011 Gavillet .............. A47J 31/3623
99/288

* cited by examiner

BEVERAGE MACHINE WITH A HANDY OUTLET

CROSS REFERENCE TO RELATED APPLICATIONS

The present application is a National Stage of International Application No. PCT/EP2011/068363, filed on Oct. 20, 2011, which claims priority to European Patent Application No. 10189061.4, filed Oct. 27, 2010, the entire contents of which are being incorporated herein by reference.

FIELD OF THE INVENTION

The field of the invention pertains to beverage machines using capsules of an ingredient of the beverage to be prepared.

For the purpose of the present description, a "beverage" is meant to include any human-consumable liquid substance, such as tea, coffee, hot or cold chocolate, milk, soup, baby food, etc. . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient.

BACKGROUND ART

Certain beverage preparation machines use capsules containing ingredients to be extracted or to be dissolved; for other machines, the ingredients are stored and dosed automatically in the machine or else are added at the time of preparation of the drink.

Most coffee machines possess filling means that include a pump for liquid, usually water, which pumps the liquid from a source of water that is cold or indeed heated through heating means, such as a heating resistor, a thermoblock or the like.

Such machine typically have a brewing unit for holding and extraction the beverage ingredient. To introduce the ingredient into the brewing unit and then remove the ingredient upon use, the brewing unit has a closure mechanism that may be motorized or driven by a handle that is operable by a user. EP 1 208 782, EP 1 686 879, EP 1 731 065, EP 1 829 469, EP 1 864 598, EP 1 865 815, EP 1 867 260, EP 1 878 368, EP 2 222 210, EP 2 222 211, EP 2 222 212, EP 2 227 121, EP 2 227 122, US 2008/0006159, U.S. Pat. No. 7,165,488 and WO 2007/111884 disclose such machines.

Moveable coffee machine are already known. EP 1 878 368 discloses a beverage machine having a functional block that is rotatably mounted on a support base. The functional block can be designed to be removable from the support base. EP 1 864 598 discloses an autonomous beverage machine that can be mounted onto a docking station. The beverage machine is arranged to be operable whether connected to the docking station or disconnected therefrom.

These machines are usually arranged to be placed at some convenient location on a support surface in a kitchen or bar or in an office or in another suitable environment, typically close to the mains and to a source of water, in particular close to the kitchen sink, and are not easily movable. This is inconvenient when the machine or the supporting surface needs to be cleaned or the machine otherwise moved, e.g. to a different room. When this happens, the user tends to seize the machine wherever he manages to find some gripping means, e.g. at the outlet nozzle, at the drip tray, by the machine's opening for the drip tray or waste ingredient container, under the machine's bottom . . . in an unreliable manner which may lead to dropping the machine, damaging parts of the machine exposed to excessive mechanical stress due to seizure of the machine at improper locations, to the falling out/off of some movable parts of the machine, such as the already mentioned drip tray, waste ingredient collector or even the water reservoir.

To solve these problems, EP 2 222 210 discloses a slim beverage machine having a housing that may be seized single-handed and WO 2010/015427 discloses a beverage machine with a carrying handle.

SUMMARY OF THE INVENTION

The invention relates to a machine for preparing a beverage from a pre-portioned ingredient in particular supplied to such machine within a capsule.

For instance, the machine is a coffee, tea, chocolate, cacao, milk or soup preparation machine. The machine can be arranged for preparing within a beverage processing module a beverage by passing hot or cold water or another liquid through a capsule containing an ingredient, such as a flavouring ingredient, of the beverage to be prepared, such as ground coffee or tea or chocolate or cacao or milk powder.

Such beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed, which corresponds to a serving. The volume of such a serving may be in the range of 25 to 200 ml, e.g. the volume for filling a cup or mug, depending on the type of beverage. Formed and dispensed beverages may be selected from ristrettos, espressos, lungos, cappuccinos, café latte, americano coffees, teas, etc. . . . In particular, a coffee machine may be configured for dispensing espressos, e.g. an adjustable volume of 20 to 60 ml per serving, and/or for dispensing lungos, e.g. a volume in the range of 70 to 150 ml per serving.

In particular, the beverage preparation machine comprises:
- a mixing unit for receiving a capsule containing a pre-portioned flavouring ingredient a capsule, such mixing unit being arranged for combining ingredients and/or for an infusion of ingredients, e.g. by brewing;
- a liquid circuit for circulating a liquid from a liquid reservoir into the mixing unit for mixing with such flavouring ingredient and such liquid to form such beverage;
- a beverage outlet for dispensing such beverage upon formation to a beverage dispensing area for supporting a user-cup or a user-mug, the dispensing area may be formed by a support surface of the machine or may be virtual, e.g. a support surface on which the machine itself rests such as a table; and
- a carrying handle for seizing and carrying such machine single-handed, In accordance with the invention, the carrying handle, in particular when seized single-handed during such carrying:
- extends over such beverage dispensing area, in particular the carrying handle being located vertically above the dispensing area while carrying such machine single-handed; and/or has a seizure surface forming a loop in cross-section around the mixing unit and/or the beverage outlet, the seizure surface being seizable by a single human hand over a predominant part of the cross-sectional loop.

The mixing unit may be of any type. For instance, the mixing unit has: a liquid inlet for an incoming flow of liquid to be flavoured by the flavouring ingredient and an outlet for an outflow of beverage formed by flavouring of the liquid. The mixing unit may have a capsule chamber that is formed inbetween two relatively movable parts that can be moved apart for inserting an ingredient capsule and/or evacuating such a capsule upon use and that can be moved together for circulating the liquid via the chamber and the capsule containing the flavouring ingredient.

The handle should be so arranged on the machine that the entire weight of the machine can be supported by the handle without risk of damage or deformation of the machine, as might for instance happen if a user pulls a machine by seizing an apparent component that is not adapted for safely supporting the machine's weight during carrying, such as an electric cable or a handle closing or opening the brewing unit. The size and shape of the handle's seizure surface should be adapted to the shape and capacity of a normal human hand, namely an adult hand, to allow a firm seizure of the machine by the handle, sufficient for the user to safely carry the machine with all its weight single-handed via the seizure surface. Optionally, the seizure surface includes a means, such as a surface structure or composition, in particular an anti-skid surface that provides friction against a human hand to reduce the necessary seizure force needed to achieve a reliable gripping.

Typically, the handle extends generally longitudinally in the direction of flow of liquid within the mixing unit and/or the outlet.

The above cross-sectional loop formed by the seizure surface may have a length in the range from 1 to 40 cm, in particular from 3 to 35 cm, such as 5 to 30 cm. This length may be in the range from 10 to 25 cm, in particular from 12 to 18 cm.

The seizure surface is typically seizable by a single human hand over more than half of the cross-sectional loop, in particular over more than 60% of this loop such as more than 75 or 80% or even over the entire loop. For instance, an adult hand having an overall length measured from the wrist in the range of 16 to 22 cm, such as 18 to 20 cm, can be used as a reference for dimensioning the seizure surface.

Advantageously, the seizure surface is seizable by a single human hand over an angle greater than a straight angle, this seizure surface being in particular seizable by a single human hand extending over the cross-sectional loop entirely.

In an embodiment, the carrying handle extends over the beverage dispensing area.

Typically, the machine comprises a body, e.g. containing the machine's active fluid components such as a pump and/or a heater and optionally the control unit. The carrying handle may be fixed to the body by at least one arm, in particular an upright arm extending from the body to the carrying handle. This arm may include a liquid conduit extending from the body into the carrying handle.

The outlet may have a beverage delivery opening at an extremity of the handle.

The carrying handle can be fixed to the body by a pair of arms facing one another across the body, the outlet having in particular a beverage delivery opening generally at mid-length of the carrying handle.

The body has an upper generally horizontal surface from which the arm extends generally upright and which forms the dispensing area. The body may have a cup support with a surface that is movable relative to the outlet, e.g. to support cups or mugs of different heights and/or sizes.

The body may have an upper generally horizontal surface from which the arm extends and may have a docking arrangement for connecting and supporting the liquid reservoir.

The liquid circuit may include: an inline heater, such as a thermoblock and/or an on-demand heater, typically to heat the liquid, e.g. water, to a temperature in the range of 60 to 95° C.; and/or a pump for circulating the liquid from the liquid reservoir to the mixing unit, the pump being optionally arranged to pressurise liquid in the range from 2 to 25 bar such as 5 to 18 bar.

The seizure surface can be arranged to accommodate at least three or four seizing fingers of a human hand, the surface being in particular provided with a profile mimicking finger marks. The seizure surface may have an anti-skid structure that ensures friction against a human hand to reduce the necessary gripping force needed to achieve a safe gripping, e.g. the seizure surface is rubber-based and/or is striated.

Usually, the machine comprises one or more removable parts, such as a removable drip tray, a liquid reservoir, a used ingredient receptacle and/or an ingredient supply device, all the removable parts being secured so as to remain safely in place is such machine when such machine is seized and displaced single-handed by the carrying handle. Preventing the parts from dropping out of the machine when carried may be achieved by locating the handle generally vertically above the machine's centre of gravity when the machine is in position on a support surface to prepare a beverage, i.e. the machine is not significantly inclined into a different orientation when lifted via the handle. The removable parts may also be maintained in the machine by a reversible fixing mechanism, e.g. lock, snap, magnet, force fitting, etc. . . .

Hence, the machine of the invention provides a simple handle for the user to lift and/or displace the machine. Typically, the handle is fixed to the machine's structure, e.g. support frame and/or outer housing.

The machine typically has an operative orientation, e.g. when placed on a table or other horizontal surface, for dispensing beverages. The machine would also have a corresponding carrying orientation when lifted single-handed by the handle. In this case, the carrying orientation can be inclined relative to the operative orientation by a tilting angle of less than 30 deg, such as in the range of 1 to 10 or 20 deg, the carrying orientation being in particular identical to the operative orientation. When the carrying orientation is inclined in such a manner, it means that the machine when lifted is slightly tilted with respect to its operative orientation. Different tilting angles for the same machine may for instance result from the presence in the machine's of liquid or ingredient reservoirs whose state of filling affect the position of the centre of gravity of the machine.

For instance, the machine has a foot or bottom face for resting on a generally parallel horizontal external support surface, such as a table. In this case, the handle in its carrying position and the centre of gravity of the machine's body can be vertically aligned, perpendicularly to the foot or bottom face, in which case the machine is not tilted when lifted via the handle. Alternatively, the handle in its carrying position and the centre of gravity of the machine can be at a tilting angle of less than 30 deg thereto, such as in the range of 1 to 10 or 20 deg to a perpendicular direction to the foot or bottom face of the machine.

BRIEF DESCRIPTION OF THE DRAWINGS

The invention will now be described with reference to the schematic drawings, wherein.

DETAILED DESCRIPTION

Figure 1:
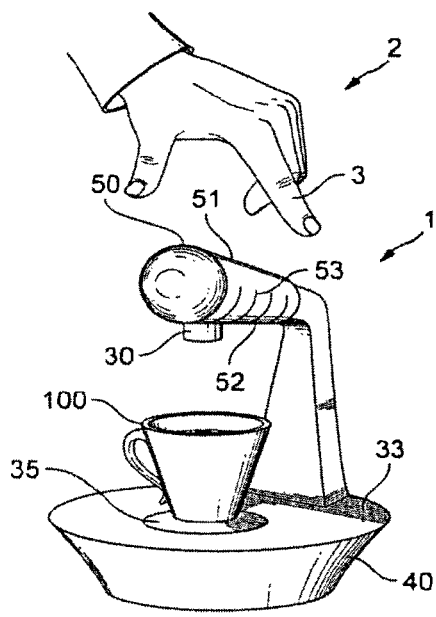
FIGS. 1 to 3 illustrate a first embodiment of a beverage machine according to the invention.
Figure 2:
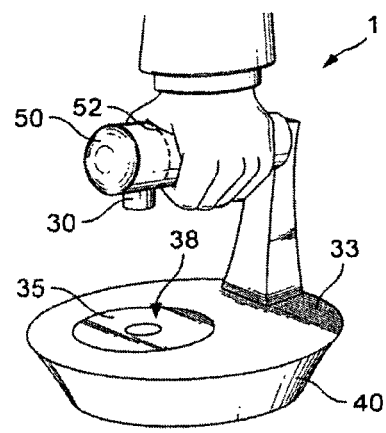
Figure 3:
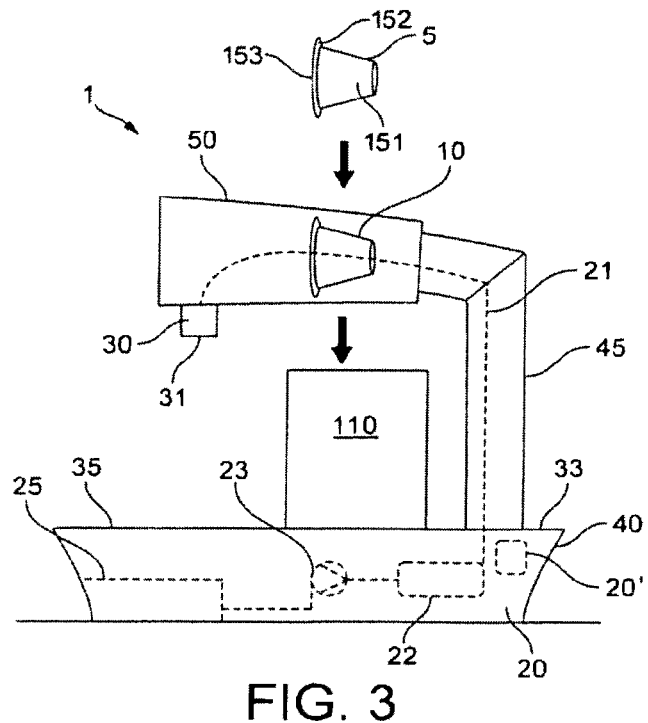

FIGS. 1 to 3 illustrate an exemplary embodiment of a beverage machine 1 according to the invention. Machine 1 has a mixing unit 10, e.g. a brewing unit, for receiving a capsule 5 containing a pre-portioned flavouring ingredient such as tea or coffee or chocolate or powder milk.

Typically, unit 10 includes a first and a second part movable relative to the first part from a position for processing in unit 10 the ingredient for forming a beverage 6 to a transfer position for inserting such ingredient into unit 10 via an opening 11 and/or for evacuation thereof from unit 10 to a capsule collector 110. Such ingredient in capsule 5 is typically a flavouring ingredient.

For example, the first part can be more or less stationary relative to the machine's structure, e.g. frame or housing, and the second part may be driven to and away from the first part between the transfer and the processing positions. Relative motion between the parts may be achieved manually or may be motorized. One of these parts may define a chamber while the other part forms a member 31, e.g. generally shaped as a plate. These chamber and member can be spaced apart for receiving and/or evacuating an ingredient capsule 5 therebetween. Typically, these first and second parts in their processing position can be arranged for mixing liquid, such as an incoming flow of hot water, with flavouring ingredient, e.g. coffee or tea, of capsule 5 to form flavoured beverage 6. The flavouring ingredient may in particular be supplied as a solid, e.g. ground coffee, tea leaves, powder milk, etc.

In a particular embodiment, these first and second parts form a brewing unit, e.g. of a tea or coffee machine 1. The flavouring ingredient is supplied within a capsule 5 into the brewing unit. The interaction between the brewing unit 10 and the flavouring ingredient within capsule 5, may be of the type disclosed in EP 1 646 305, EP 1 859 714 or in EP 2 205 133.

The relatively movable parts in their processing position are arranged for holding the pre-portioned flavouring ingredient supplied within capsule 5 while liquid is circulated therethrough to form a beverage 6. Such a flavouring capsule 5 may have a cup-shaped body 151 with a rim 152 for fixing a lid 153 thereon. Body 151 is configured for containing a pre-portioned amount of flavouring ingredient.

When closed capsules of flavouring ingredients are used, these relatively movable first and second parts may include a capsule opener such as blades and/or a tearing tool, e.g. a plate with a tearing profile, for instance as known form Nespresso™ machines.

Machine 1 further includes a liquid circuit 20 (indicated in doted lines in FIG. 3) for circulating a liquid from a liquid reservoir 25 into mixing unit 10 for mixing said flavouring ingredient and said liquid to form beverage 6. Circuit 20 may include a liquid driver, such as a pump 23, and a thermal conditioner, such as a heater 22, for circulating thermally conditioned liquid, such as water, from a source, e.g. a liquid reservoir 25, into unit 10. A control unit 20' (indicated in dotted lines in FIG. 3) may be provided to control the active components of circuit 20, e.g. conditioner 22 and driver 23, and/or to acquire user-requests and/or provide user-information via one or more user-interfaces. Examples of upstream fluid arrangements are disclosed in WO 2009/074550 and in WO 2009/130099.

Machine 1 has a beverage outlet 30 for dispensing beverage 6 upon formation to a beverage dispensing area 35,37 for supporting a user-cup or a user-mug 100. Dispensing area 35,37 may be formed by grid or like structure for allowing the passage of liquid and may be located above a drip tray 36,38 for collecting liquid, in particular drops from outlet 30.

Machine 1 has a carrying handle 50 for seizing and carrying such machine single-handed. Carrying handle 50 extends over and above beverage dispensing area 35,37; and/or handle 50 has a seizure surface 51 forming a loop 52 in cross-section around mixing unit 10 and/or around beverage outlet 30, seizure surface 51 being seizable by a single human hand 2 over a predominant part of the cross-sectional loop 52.

Hence, beverage preparation machine 1 is provided with a simple arrangement for allowing a user to displace safely the machine single-handed.

Handle 50 extends generally longitudinally in a direction of flow of liquid within the mixing unit 10 and/or the outlet 30, as illustrated in FIG. 3 by the dotted lines within handle 50.

Cross-sectional loop 52 may have a length in the range from 1 to 40 cm, in particular from 3 to 35 cm, such as 5 to 30 cm, optionally in the range from 10 to 25 cm, for instance from 12 to 18 cm. The length of the loop is arranged for an ergonomic and safe seizure of handle 50 by a human hand 2.

Typically, seizure surface 51 is seizable by a single human hand 2 over an angle (around the outlet conduit and/or the mixing unit) greater than a straight angle. Seizure surface being in particular seizable by a single human hand extending over loop 52 entirely. In particular, a user may close his/her hand around loop 52.

Machine 1 may include a body 40, carrying handle 50 being fixed to body 40 by an arm 45. As illustrated in FIGS. 1 to 3 arm 45 can be upright and extend from body 40 to carrying handle 50. Outlet 30 may have a beverage delivery opening 31 at an extremity of handle 50.

Figure 4:
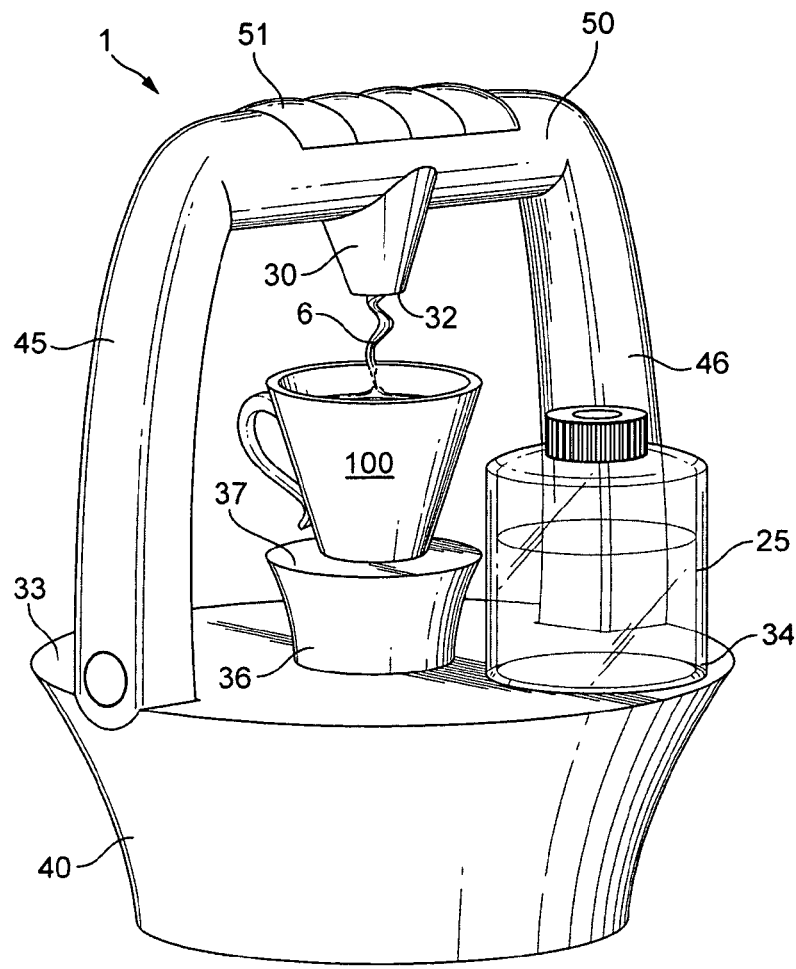
FIGS. 4 and 5 show a second embodiment of a beverage machine according to the invention.
Figure 5:
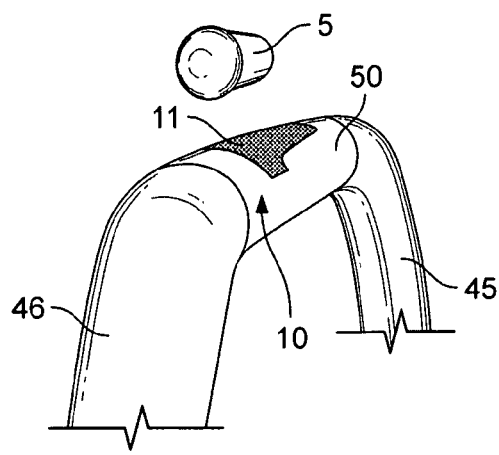

In the embodiment illustrated in FIGS. 4 and 5, in which the same numeric references generally designate the same or similar elements, a pair of arms 45,46 is provided that forms with handle 50 a bridge over dispensing area 37. Arms 45,46 face one another across body 40. Outlet 30 has in particular a beverage delivery opening 32 generally at mid-length of the carrying handle 50 over dispensing area 37. One arm 46 may be used for guiding an evacuation of capsules 5 upon use in mixing unit 10, for example, capsules 5 may be evacuated to a capsule collector (not shown) located in body 40.

At least one arm 45 of machines 1 illustrated in the appended Figures may include a liquid conduit 21 extending from body 40 to carrying handle 50.

Body 40 may have an upper generally horizontal surface 33 from which arm 45 extends generally upright. This surface 33 may be flush with or form dispensing area 35. Dispensing area may have a stationary cup/mug support surface 35, e.g. as illustrated in FIGS. 1 to 3, or may be a surface 37 movable up and down under outlet opening 32, e.g. via a piston system 36 as illustrated in FIG. 4.

Surface 33 of body 40 may also form a docking arrangement 34 for connecting and supporting liquid reservoir 25.

Docking arrangement 34 may include a seat for receiving reservoir 25 and a liquid connector for bringing reservoir 25 in liquid communication with circuit 20, as known in the art. Likewise, used capsule collector 110 may be supported on surface 33, e.g. with a securing arrangement.

Liquid circuit 20 typically comprises an inline heater 22, such as a thermoblock and/or an on-demand heater, and a pump 23 for circulating liquid from liquid reservoir 25 to mixing unit 10. Beverage 6 formed in mixing unit 10 is guided via outlet conduit 30 to outlet opening 31,32 where it is delivered into cup/mug 100.

Seizure surface 51 can be arranged to accommodate at least three or four seizing fingers 3 of a human hand 2. Typically, surface 51 has a profile with side-by-side recesses mimicking the shape of fingers 3 of a hand 2 that seizes surface 51.

Seizure surface 51 may include an anti-skid structure 53 that ensures friction against a human hand 2 so as to reduce the necessary gripping force needed to achieve a safe gripping. The anti-skid structure 53 may include an anti-skid shape such as stria and/or an anti-skid material such as rubber or a rubber-based material.

Machine 1 normally includes one or more removable parts, such as a drip tray 36,38, a liquid reservoir 25 and used capsule receptacle 110, all the removable parts being secured so as to remain safely in place in such machine 1 when machine 1 is seized and displaced single-handed by the carrying handle 50.

As apparent from the above disclosure, the beverage machine of the invention is of a particularly simple conception and is configured, in a simple manner, to be easily and safely liftable and displaceable, single-handed by a user to a different location.

The invention claimed is:

1. A machine for preparing a beverage, the machine comprising:
   a mixing unit configured to receive a capsule containing a pre-portioned flavoring ingredient;
   a liquid circuit comprising a heater and a pump configured to circulate a liquid from a liquid reservoir into the mixing unit for mixing the pre-portioned flavoring ingredient and the liquid to form the beverage;
   a beverage outlet configured to dispense the beverage upon formation to a beverage dispensing area configured to support a user-cup or a user-mug;
   a carrying handle for seizing and carrying the machine by a single hand, the carrying handle comprising the beverage outlet;
   a body to which the carrying handle is fixed by at least one arm, the body has an upper horizontal surface from which the at least one arm extends upright; and
   a first component positioned in the body under the horizontal surface and selected from the group consisting of the liquid reservoir, the pump, the heater and combinations thereof,
   the carrying handle when seized by the single hand during such carrying has a characteristic selected from the group consisting of:
   extending over and above the beverage dispensing area; and
   having a seizure surface forming a cross-sectional loop in cross-section around a second component selected from the group consisting of the mixing unit, the beverage outlet, and a combination thereof, the seizure surface being seizable by any hand over a predominant part of the cross-sectional loop.

2. The machine of claim 1, wherein the carrying handle extends longitudinally in a direction of flow of the liquid within the second component.

3. The machine of claim 1, wherein the cross-sectional loop has a length from 1 to 40 cm.

4. The machine of claim 1, wherein the seizure surface is seizable by the single hand over an angle greater than a straight angle, the seizure surface being seizable by the single hand extending over the cross-sectional loop entirely.

5. The machine of claim 1, wherein the carrying handle extends over the beverage dispensing area.

6. The machine of claim 1, wherein the at least one arm comprises a liquid conduit extending from the body to the carrying handle.

7. The machine of claim 6, wherein an extremity of the carrying handle comprises a beverage delivery opening of the beverage outlet.

8. The machine of claim 6, wherein the carrying handle is fixed to the body by a pair of arms facing one another across the body, the beverage outlet having a beverage delivery opening at mid-length of the carrying handle.

9. The machine of claim 1, wherein the upper horizontal surface forms or is flush with the beverage dispensing area.

10. The machine of claim 1, wherein the body has a cup support with a surface that is movable relative to the beverage outlet.

11. The machine of claim 1, wherein the body has a docking arrangement configured to connect and support the liquid reservoir.

12. The machine of claim 1, wherein the seizure surface has at least one feature selected from the group consisting of:
    a shape to accommodate at least three or four fingers of the single hand; and
    an anti-skid structure that provides friction against the single hand to reduce the necessary gripping force needed to achieve a safe gripping.

13. The machine of claim 1, further comprising one or more removable parts secured to remain safely in place in the machine when the machine is seized and displaced by the carrying handle.

14. A machine for preparing a beverage, the machine comprising:
    a body;
    a mixing unit configured to receive a capsule containing a pre-portioned flavoring ingredient;
    a liquid circuit comprising a heater and a pump configured to circulate a liquid from a liquid reservoir into the mixing unit to mix the pre-portioned flavoring ingredient and the liquid to form the beverage;
    a beverage outlet configured to dispense the beverage upon formation to a beverage dispensing area configured to support a user-cup or a user-mug;
    a carrying handle for seizing and carrying the machine single-handed, the carrying handle comprising the beverage outlet, the carrying handle is fixed to the body by an arm comprising a liquid conduit extending from the body to the carrying handle;
    an upper horizontal surface of the body, the arm extends upright from the upper horizontal surface of the body; and
    a first component positioned in the body under the horizontal surface and selected from the group consisting of the liquid reservoir, the pump, the heater and combinations thereof,
    the carrying handle when seized during the carrying has at least one characteristic selected from the group consisting of:

(i) extending over and above the beverage dispensing area; and (ii) having a seizure surface forming a cross-sectional loop around a cross-section of a second component selected from the group consisting of the mixing unit, the beverage outlet, and a combination thereof, the seizure surface being seizable by any hand over a predominant part of the cross-sectional loop.

15. The machine of claim 14, wherein an extremity of the carrying handle comprises a beverage delivery opening of the beverage outlet.

16. The machine of claim 14, wherein the carrying handle has both characteristics (i) and (ii).

17. The machine of claim 1, wherein the first component under the horizontal surface comprises the liquid reservoir.

18. The machine of claim 1, wherein the first component under the horizontal surface comprises the heater.

* * * * *